ature of the filed, showing the timely relationship between the two pulses.

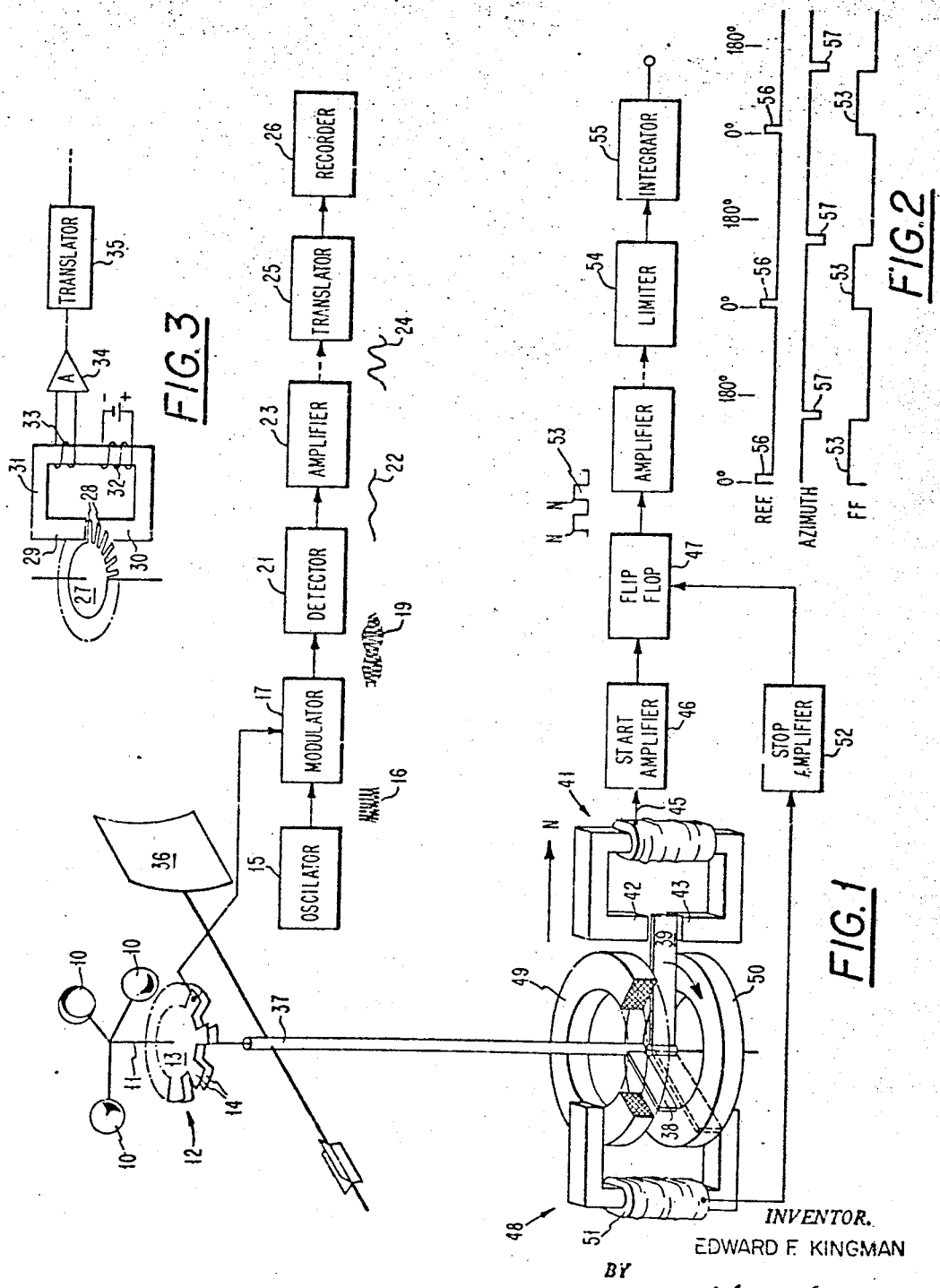

United States Patent Office 3,282,099
Patented Nov. 1, 1966

3,282,099
WIND SPEED AND DIRECTION TRANSDUCING APPARATUS
Edward F. Kingman, Saratoga, Calif., assignor to Climet Instruments Inc., Sunnyvale, Calif., a corporation of California
Filed Jan. 6, 1964, Ser. No. 335,953
11 Claims. (Cl. 73—189)

This invention relates to wind speed and direction transducing apparatus, and more particularly to such apparatus for contemporaneously sampling wind azimuth when sampling wind velocity. The aforesaid samplings are related contemporaneously by an angular displacement detection means which provides a first pulse when a marker on the anemometer shaft passes a reference point and subsequently generates a second pulse when the marker later coincides with the azimuth of the wind.

In the past, wind velocity has been sampled independently of direction readings. Where direction is sampled at fixed time intervals, changes in wind azimuth for short periods can be overlooked and thereby remain unrecorded.

Therefore, it is a general object of the invention to provide an improved wind speed and direction sampling apparatus.

Another object of the invention is to provide wind speed and direction apparatus whereby wind azimuth is sampled contemporaneously with sampling of wind velocity.

A further object of the invention is the provision of means for measuring angular displacement of a rotatable marker from a fixed reference point, independently of the speed of rotation of the shaft.

A more particular object of the invention is the provision of means for electrically providing analog measurement of the angular displacement of a positionable marker from a fixed reference point radially of a rotating shaft independently of the speed of rotation of the shaft.

These and other objects of the invention will be more clearly apparent from the following description of a preferred embodiment when considered in conjunction with the drawing in which:

FIGURE 1 schematically shows a preferred embodiment of the invention;

FIGURE 2 graphically illustrates the timed relationship of pulses generated by the system of FIGURE 1; and FIGURE 3 shows another embodiment of a portion of the system shown in FIGURE 1.

In general, there is provided in a wind speed and direction transducing apparatus, wind direction detecting means comprising a first reference marker disposed to rotate continuously in a predetermined direction about an axis at a speed proportional to wind velocity. A first sensing means is disposed at a first angular disposition with respect to the axis to sense the first marker once each revolution. A second reference marker is rotatable about the axis and positionable by the wind to a second angular disposition with respect to the axis. A second sensing means including the second reference marker is provided for sensing coexistence of the first and second reference markers at the second angular disposition.

Circuit means are provided which serve to relate the elapsed time between sensing the first reference marker at the first disposition and at the second angular disposition for comparison to the elapsed time between two successive sensings of the first reference marker at the first angular disposition. In this manner, a measuring of the angular displacement of the second reference marker from the first angular disposition is obtained irrespective of wind velocity. Accordingly, where the first angular disposition represents a direction such as true north, i.e., 0°, the second angular disposition will represent the azimuth of the wind, i.e., the compass bearing toward which the wind is blowing.

Angular displacement detection means are employed in the foregoing scheme to provide angular displacement measurements contemporaneously with shaft speed measurements.

Generally, the displacement detection means comprises a first reference marker preferably of a relatively high permeability material disposed to rotate continuously in a predetermined direction about an axis. First sensing means provide a magnetic flux field disposed at a first angular disposition with respect to the shaft and serve to sense the first marker once each revolution. A second reference marker, preferably of a relatively high permeability material, is arranged to be rotatable about the same axis and positionable to a second angular disposition with respect to the axis. Second sensing means are provided including a pair of magnetic pole pieces encircling the axis and spaced apart therealong. The first and second reference markers are disposed to rotate about the axis in planes between the pole pieces and disposed to provide a shunt magnetic flux path from one pole piece to the other upon alignment of the first and second reference markers along a common radius.

The first sensing means generates a start pulse and the second sensing means generates a stop pulse. A counter is arranged to be operated under control of the start and stop pulses.

As shown in the drawing, therefore, means for sensing wind speed includes a plurality of wind cups 10 mounted on a shaft to rotate about a vertical axis 11. An air dielectric capacitor 12 is arranged whereby a number of minimum and maximum capacity points (e.g. forty) occur during each revolution of axis 11. Capacitor 12 includes a pair of plates 13 disposed in close spaced relation along axis 11. Plates 13 include a number of radially extending fingers 14. Plates 13 are also arranged whereby one plate 13 rotates with respect to the other. Accordingly, as fingers 14 pass into and out of radial alignment, minimum and maximum capacity conditions are provided.

This variation in capacitor reactance modulates the output signal of an oscillator 15 which is providing a constant frequency signal 16 to a suitable modulator 17. Thus, the signal received by modulator 17 via line 18 serves to generate an amplitude modulated signal represented by the envelope 19. The oscillator frequency, which is high compared with the modulating frequency, is removed by a suitable detector circuit 21 to provide an output signal 22 having an amplitude proportional to the speed of rotation.

Signal 22 is suitably amplified via amplifier 23 to provide a signal represented as 24. Signal 24 is then fed to a translator of conventional design such as the Model 013-5 portable translator manufactured by Climet Instruments, Inc., Sunnyvale, California. The foregoing translator 25, briefly stated, employs a saturable toroid type frequency meter whose output is a constant volt-second pulse. Rectified, this pulse then produces a D.C. analog suitable to drive a recorder 26, for example, of the type such as Model 0–1ma Esterline-Angus Recorder.

Another means for detecting wind velocity is shown in FIGURE 3 wherein the anemometer cups 10 serve to drive a disc 27 mounted on axis 11. Disc 27 includes a large number of fingers 28, for example, one hundred, which pass between the pole pieces 29, 30 of a ring-type or other magnetic core 31. Core 31 is energized by a winding 32 to provide a magnetic flux field between pole pieces 29, 30. Fingers 28 are preferably of a relatively highly permeable material so as to cause detectable variations in the magnetic flux field between the pole pieces 29, 30. These changes in the flux field can be sensed by a winding 33 and amplified through a suitable amplifier 34. The pulses are then transmitted to a translator 35 which operates in substantially the same manner as described above.

Means serving to sample azimuth of the wind includes a wind vane 36 mounted for rotation about axis 11 on a sleeve 37. The lower end of sleeve 37 includes an indicia portion such as the reference marker 38, preferably formed as a radially extending finger of relatively high permeability material. Marker 38 is positionable by the wind to an angular disposition with respect to axis 11 corresponding to the azimuth of the wind. Another reference marker 39, preferably formed as another radial finger of relatively high permeability material, is carried to rotate with axis 11.

A sensing means 41 is disposed at an angular disposition corresponding, for example, to a northern azimuth and arranged to sense marker 39 once each revolution to provide a periodic "clock" pulse. Sensing means 41 is schematically shown in FIGURE 1 and includes a transducer having spaced apart pole pieces 42, 43. Pole pieces 42, 43 are spaced apart sufficiently to permit the free end of marker 39 to pass therebetween.

Sensing means 41 is schematically shown with windings 44 which serve to generate a start pulse whenever marker 39 passes between pole pieces 42, 43 since there is a change in flux due to a change in reluctance. Windings 44 can be arranged as shown for windings 32, 33 in FIGURE 3 described above. Thus, once each revolution, a clock pulse is generated on line 45 and fed to an amplifier 46. The amplified clock pulse serves to start a counter 47 such as a scale of two counter. A suitable scale of two counter can be a flip-flop or a Schmitt trigger of known construction, or other suitable means known in the art. For example, a two input flip-flop is shown at page 807 of the "Encyclopedic Dictionary of Electronics and Nuclear Engineering," Sarbacher, Prentice-Hall, 1959.

Counter 47 receives a stop pulse when marker 39 becomes radially aligned with marker 38. Means serving to generate the stop pulse includes sensing means 48. Sensing means 48 includes a pair of magnetic pole pieces 49, 50 encircling axis 11 and preferably formed as toroids disposed coaxially of axis 11. Pole pieces 49, 50 are spaced apart along axis 11 whereby reference markers 38, 39 are disposed to rotate in planes therebetween. Sensing means 48 includes windings 51 which can be arranged as shown for windings 32, 33 in FIGURE 3. Windings 51 thereby provide a magnetic field between pole pieces 49, 50. A shunt magnetic flux path is formed from one pole piece 49, 50 to the other upon radial alignment of markers 38, 39. Existence of the magnetic shunt path provides a detectable variation in the reluctance between pole pieces 49, 50 which generates a stop signal which is amplified by a suitable amplifier 52. The amplified signal from amplifier 52 is fed to the scale of two counter 47 thereby changing its condition to a second stable state.

The stop pulse thereby determined the duration of the wind direction "on" pulse. These wind direction pulses are represented at 53, the left-hand edge corresponding to the azimuth of 0°, i.e., north.

The output of flip-flop 47 is amplified and fed to a limiter 54 which ensures that the pulses are of the same amplitude. Therefore, the average D.C. value of the wave 53 is proportional to the azimuth.

An integrator 55, preferably an analog integrator of known construction, serves to provide an output voltage proportional to the ratio of the "on" time of counter 47 to the elapsed time between successive clock pulses on line 45. This relationship can be provided by any of several integrators of suitable construction for relating the "on" time to the "off" time or to the total elapsed time for a complete revolution.

Accordingly, counter 47, limiter 54, and integrator 55 serve to provide means which relates the elapsed time between successive start pulses to the elapsed time between the start pulse and the stop pulse.

Thus, as shown in FIGURE 2, a clock pulse 56 is arranged to be generated at 0° in the rotation of axis 11. A stop pulse 57, which can be either positive going or negative going depending upon the connections to be made in, and type of counter 47 selected, will occur at an angular disposition corresponding to the heading of vane 36. The "on" time of the scale of two counter 47 is represented by pulse 53 which is related by integrator 55 to the total elapsed time for each revolution of axis 11, either by comparison to the "off" time or the total time for a revolution.

Thus, it will be evident that the azimuth of the wind will be sampled contemporaneously with the sampling of wind speed and where the output of integrator 55 is fed to a recorder, such as the recorder 26, can be continuously monitored. As the speed of the wind will vary, it will be further evident that the foregoing described arrangement provides an accurate measurement of angular displacement of vane 36 from a reference heading regardless of the speed of rotation about the axis.

I claim:

1. In a wind speed and direction transducing apparatus, wind direction detecting means comprising a first reference marker disposed to rotate continuously in a predetermined direction about an axis at a speed proportional to wind velocity, first sensing means disposed at a first angular disposition with respect to said axis to sense said first marker once each revolution, a second reference marker rotatable about the axis and positionable by the wind to a second angular disposition with respect to said axis, second sensing means including said second reference marker for sensing coincidence of said first and second reference markers at said second angular disposition, and means for comparing the elapsed time between sensing said first reference marker at said first and second angular dispositions with the elapsed time between two successive sensings of said first reference marker at said first angular disposition to measure the angular displacement of said second reference marker from said first angular disposition thereby indicating wind direction.

2. In a wind speed and direction transducing apparatus, wind direction detecting means comprising a first reference marker disposed to rotate continuously in a predetermined direction about an axis at a speed proportional to wind velocity, first sensing means disposed at a first angular disposition with respect to said axis to sense said first marker once each revolution and generate a clock pulse, a second reference marker rotatable about the axis and positionable by the wind to a second angular disposition with respect to said axis, second sensing means including said second reference marker for sensing coincidence of said first and second reference markers at said second angular disposition and generate a signal, and means for comparing the elapsed time between generation of said clock pulse and said signal with the elapsed time between generation of two successive clock pulses to measure the angular displacement of said second reference marker from said first radial disposition thereby indicating wind direction.

3. In a wind speed and direction transducing apparatus, wind direction detecting means comprising a first reference marker disposed to rotate continuously in a predetermined direction about an axis at a speed proportional to wind velocity, first sensing means disposed at a first angular disposition with respect to said axis to sense said first marker once each revolution and generate a start pulse, a counter operably coupled to receive said start pulse, a second reference marker rotatable about the axis and positionable by the wind to a second angular disposition with respect to said axis, second sensing means including said second reference marker for sensing coincidence of said first and second reference markers at said second angular disposition and generate a stop pulse, said counter being operatively coupled to receive said stop pulse, and means for comparing the elapsed time between receipt by said counter of said start pulse and said stop pulse with the elapsed time between receipt by said counter of said start pulse and the next succeeding start pulse thereby indicating wind direction.

4. In a wind speed and direction transducing apparatus as defined in claim 1 wherein said first reference marker is of a relatively high permeability material and said first sensing means includes means forming a magnetic flux field, said first marker serving to provide a detectable variation in said field once each revolution, and means for sensing said variation to generate a clock pulse, and wherein said second reference marker is of a relatively high permeability material and said second sensing means includes a pair of magnetic pole pieces encircling said axis and spaced apart therealong, said first and second reference markers being disposed to rotate about said axis in planes between said pole pieces whereby alignment of said first and second reference markers on a common radius serves to form a shunt path for magnetic flux from one pole piece to the other.

5. An apparatus as defined in claim 4 wherein said first and second reference markers are formed as fingers extending radially of said axis and said pole pieces are formed as toroids coaxially disposed about said axis in spaced apart planes transversely thereof.

6. Angular displacement detection means comprising a first reference marker of relatively high permeability material disposed to rotate continuously in a predetermined direction about an axis, first sensing means providing a magnetic flux field disposed at a first angular disposition with respect to said axis and arranged and disposed to sense said first marker once each revolution to generate a start pulse, a counter operably coupled to receive said start pulse, a second reference marker of relatively high permeability material rotatable about said axis and positionable to second angular disposition with respect to said axis, second sensing means including a pair of magnetic pole pieces encircling said axis and spaced apart therealong, said first and second reference markers being disposed to rotate about said axis in planes between said pole pieces and disposed to provide a variation in the reluctance of a magnetic path from one pole piece to the other upon alignment of said first and second reference markers on a common radius, and means for sensing said change in reluctance of said path and generating a stop pulse, said counter being operably coupled to receive said stop pulse.

7. Angular displacement detection means as defined in claim 6 further including means for comparing the elapsed time between successive start pulses to the elapsed time between said start pulse and said stop pulse.

8. Angular displacement detection means comprising a first reference marker of relatively high permeability material disposed to rotate continuously in a predetermined direction about an axis, first sensing means providing a magnetic flux field disposed at a first angular disposition with respect to said axis and arranged and disposed to sense said first marker once each revolution, a second reference marker of relatively high permeability material rotatable about said axis and positionable to a second angular disposition with respect to said axis, second sensing means including a pair of magnetic pole pieces encircling said axis and spaced apart therealong, said first and second reference markers being disposed to rotate about said axis in planes between said pole pieces and disposed to provide a change in a reluctance of the magnetic flux path from one pole piece to the other upon alignment of said first and second reference markers on a common radius.

9. Angular displacement detection means comprising a first reference marker disposed to rotate continuously in a predetermined direction about an axis at a variable speed, first sensing means disposed at a first angular disposition with respect to said axis to sense said marker once each revolution, a second reference marker rotatable about said axis and positionable to a second angular disposition with respect thereto, second sensing means including said second reference marker for sensing coexistence of said first and second reference markers at said second radial disposition, and means serving to relate the elapsed time between sensing said first reference marker at said first and second angular dispositions to the elapsed time between two successive sensings of said first reference marker at said first angular disposition to measure the angular displacement of said second reference marker from said first angular disposition irrespective of the speed of rotation of said first reference marker.

10. In wind speed and direction transducing apparatus, wind azimuth detecting apparatus comprising a shaft adapted to be continuously rotated in a predetermined direction by the wind, said shaft including an indicia portion disposed on a radius thereof, means coacting with said portion and serving to generate a periodic clock pulse at a first predetermined angular disposition of said shaft, positionable means movable by the wind to define a second angular disposition of the shaft corresponding to the azimuth of the wind measured from said first angular disposition, means sensing coexistence of said indicia portion and said positionable means at said second angular disposition of said shaft and generating a signal, and measuring means for comparing the elapsed time between generation of said clock pulse and generation of said signal with the elapsed time between generation of said clock pulse and generation of the next succeeding clock pulse to indicate azimuth of the wind.

11. Transducing apparatus as defined in claim 10 further including means serving to measure the rotational speed of said shaft to determine the velocity of the wind whereby wind azimuth and velocity are sampled contemporaneously.

References Cited by the Examiner

UNITED STATES PATENTS

| | | | |
|---|---|---|---|
| 2,796,598 | 6/1957 | Cartwright | 340—271 X |
| 3,068,692 | 12/1962 | Morgan | 73—189 |
| 3,182,503 | 5/1965 | Corcoran | 73—189 X |

RICHARD C. QUEISSER, *Primary Examiner.*